United States Patent
Mott et al.

[19]

[11] Patent Number: 6,152,290
[45] Date of Patent: Nov. 28, 2000

[54] CLEANING DEVICE FOR CONVEYOR BELT ASSEMBLY

[75] Inventors: George T. Mott, Alburtis; A. Todd Gibbs, Allentown, both of Pa.

[73] Assignee: Asgco Manufacturing, Inc., Allentown, Pa.

[21] Appl. No.: 09/071,946

[22] Filed: May 1, 1998

Related U.S. Application Data

[60] Provisional application No. 60/060,183, Sep. 26, 1997.

[51] Int. Cl.[7] .................................................. B65G 45/16
[52] U.S. Cl. ............................................................ 198/499
[58] Field of Search ...................... 198/497, 499

[56] References Cited

U.S. PATENT DOCUMENTS

| | | | |
|---|---|---|---|
| 4,533,035 | 8/1985 | Reiter ...................................... | 198/499 |
| 4,696,388 | 9/1987 | Stoll ...................................... | 198/499 X |
| 4,768,644 | 9/1988 | Cromm .................................... | 198/499 |
| 4,773,526 | 9/1988 | Slikker ................................. | 198/499 X |
| 4,836,356 | 6/1989 | Mukai et al. ............................ | 198/499 |
| 4,987,993 | 1/1991 | Dohmeier ................................ | 198/499 |
| 5,161,669 | 11/1992 | Gibson, Jr. ............................. | 198/499 |
| 5,344,000 | 9/1994 | Gleason ................................. | 198/499 |
| 5,799,776 | 9/1998 | Dolan ...................................... | 198/499 |

FOREIGN PATENT DOCUMENTS

| | | | |
|---|---|---|---|
| 289659 | 11/1988 | European Pat. Off. ............... | 198/499 |
| 0338118 | 11/1993 | European Pat. Off. . | |
| 3715805 | 12/1988 | Germany ............................... | 198/497 |
| 267208 | 10/1989 | Japan ..................................... | 198/499 |
| 2227992 | 8/1990 | United Kingdom ................... | 198/499 |
| 9110609 | 7/1991 | WIPO .................................... | 198/497 |

Primary Examiner—James R. Bidwell
Attorney, Agent, or Firm—Dann, Dorfman, Herrell and Skillman; Stephen H. Eland

[57] ABSTRACT

A conveyor belt cleaner is provided having a scraper blade arranged transversely on the lower run of the belt. The scraper blade can have at least one blade or a plurality of blades pivotally connected together. A shaping element having a non-linear configuration adjusts the profile of the scraper blade to match the configuration of the shaping bar. A biasing element connected with the vertical controller biases the scraper blade towards the belt maintaining the scraper blade in contact with the belt. A vertical controller raises and lowers the position of the scraper blade to provide for angular adjustment of the scraper blade relative to the belt.

15 Claims, 8 Drawing Sheets

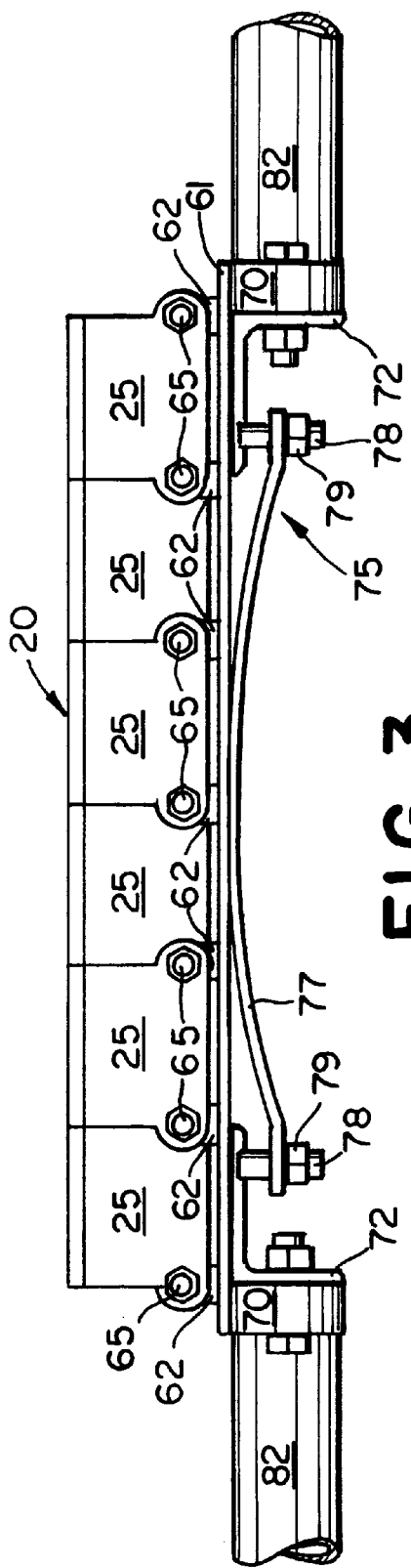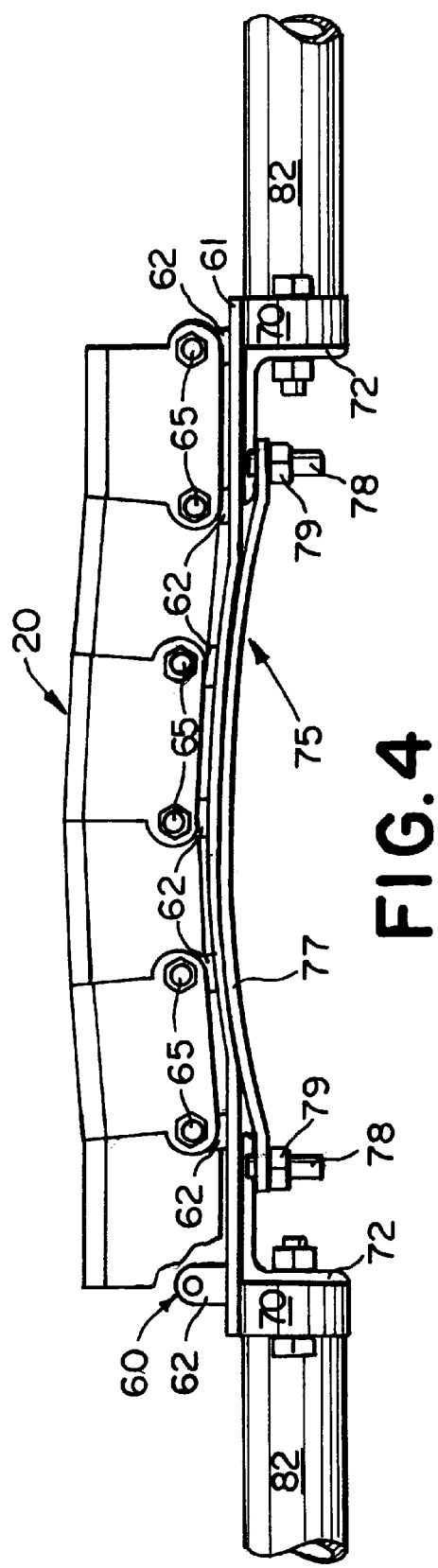

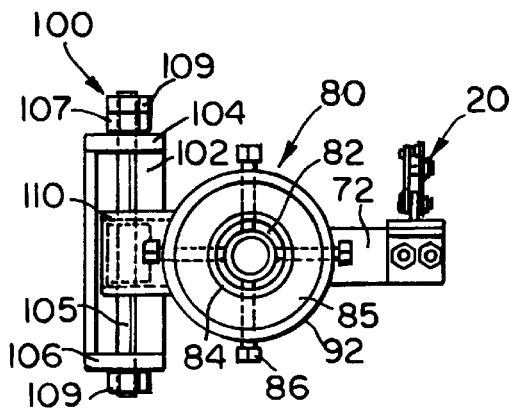
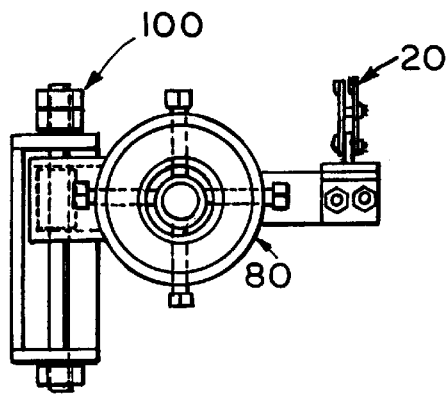
FIG. 5　　　　　FIG. 6
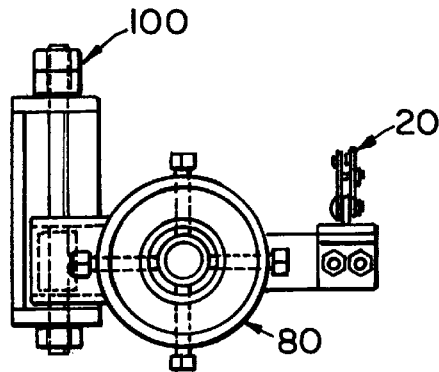
FIG. 7
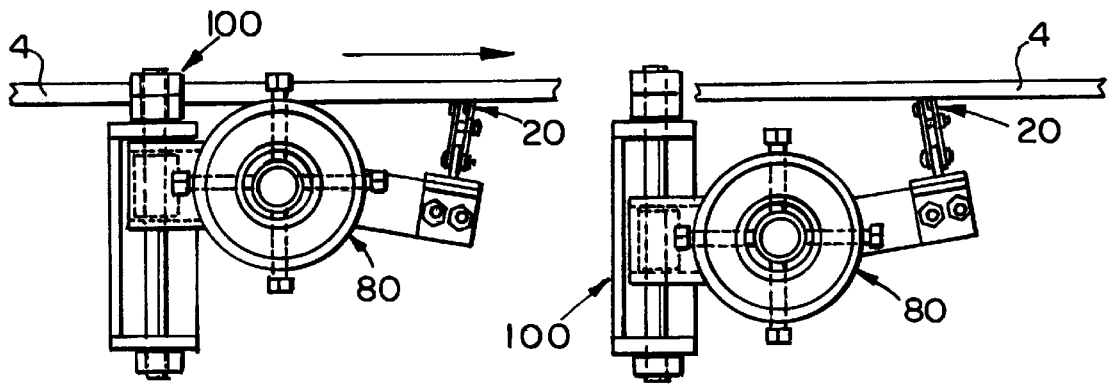
FIG. 8　　　　　FIG. 9

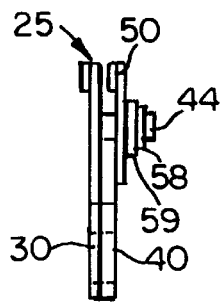
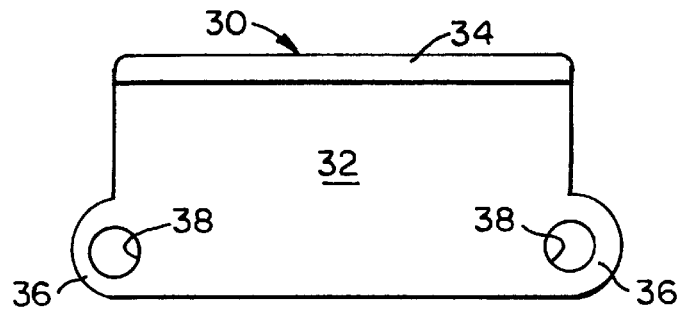
FIG.10A     FIG.10B
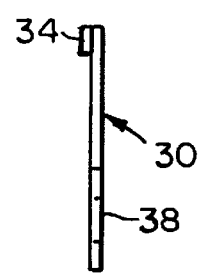
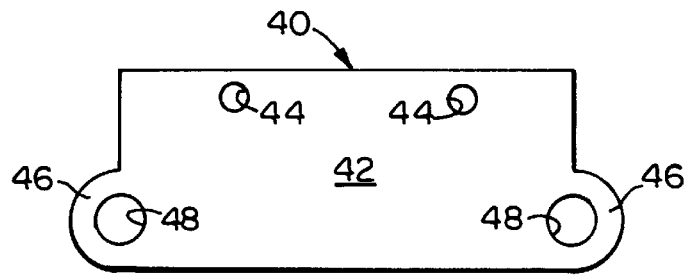
FIG.10C     FIG.10D
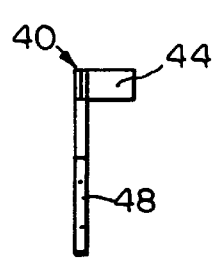
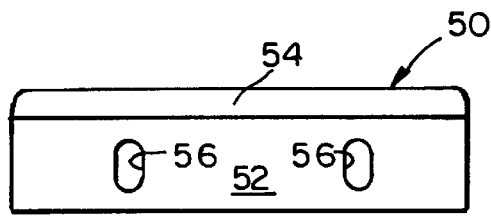
FIG.10E     FIG.10F
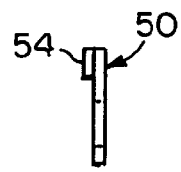
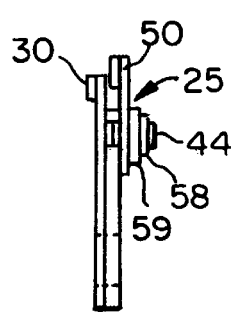
FIG.10G     FIG.10H

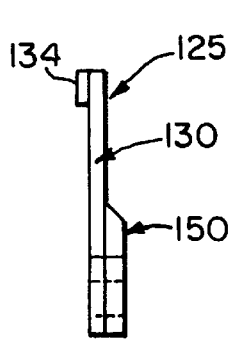
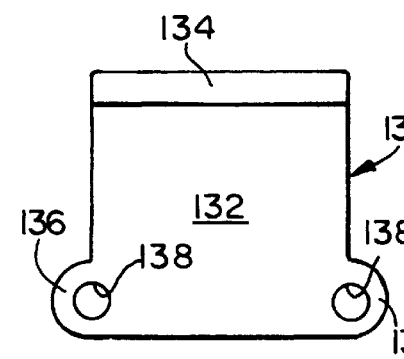
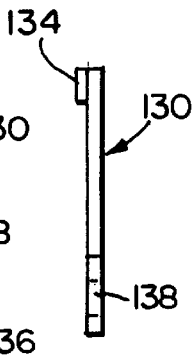
FIG.13A    FIG.13B    FIG.13C
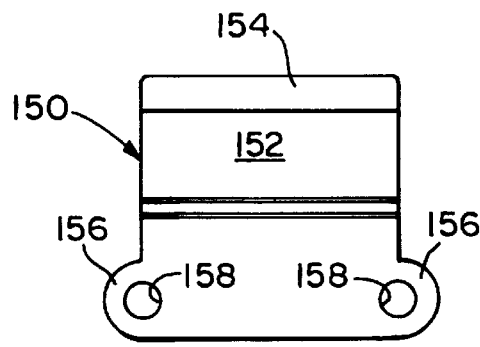
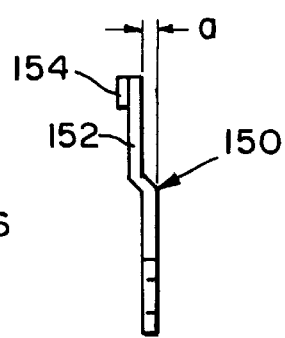
FIG.13D    FIG.13E
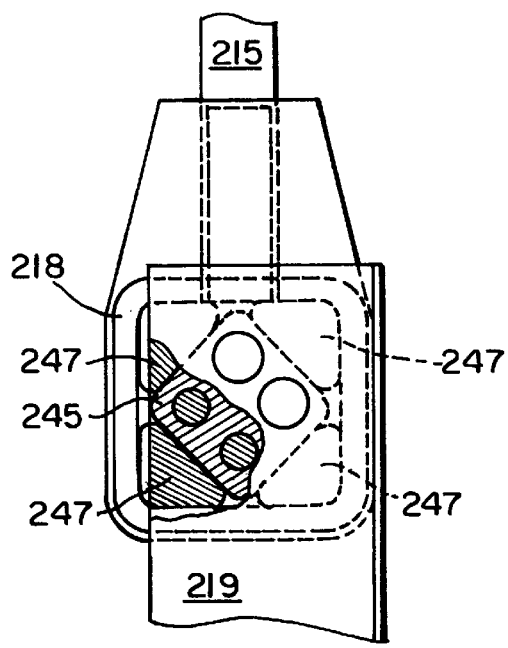
FIG.14

CLEANING DEVICE FOR CONVEYOR BELT ASSEMBLY

This application claims benefit of Provisional application 60/060,183 filed Sep. 26, 1997.

FIELD OF THE INVENTION

The present invention relates to conveyor belt cleaners and more specifically conveyor belt cleaners having a scraper blade that is vertically and angularly adjustable for maintaining contact with the conveyor belt to remove debris.

BACKGROUND OF THE INVENTION

Conveyor belts have been used in many applications to convey materials. For instance, the mining industry has long used conveyor belts to convey mined materials. Frequently, the material being conveyed adheres to the surface of the conveyor belt. Typically, some type of scraper blade is used to scrape the debris from the surface of the conveyor belt. Since the mined material is ordinarily loaded on to the central portion of the conveyor belt, the central portion of the conveyor belt wears faster than the sides of the belt. This wear results in the belt having a concave or "bellied" shape. Thus, as the scraper blade wears and the belt "bellies", it becomes necessary to adjust the scraper blade to maintain the blade in operative contact with the conveyor belt.

SUMMARY OF THE INVENTION

In accordance with the present invention, a conveyor belt cleaner is provided. The scraper blade can be comprised of one or a plurality of blade segments which are pivotally connected to each other forming a parallel row of aligned segments. The scraper blade is mounted on a support for maintaining the scraper blade in operative contact with the conveyor belt to remove debris from the belt.

Another feature of the invention includes a shaping bar having a non-linear configuration which forms the scraper blade to the corresponding scraper blade configuration. This ensures that the scraper blade will be in proper operative engagement with the conveyor belt.

A further feature of the invention provides for an adjustable vertical controller operable to adjust the vertical position of the scraper blade.

A still further feature of the invention provides a biasing element connected with the vertical controller. The biasing element biases the scraper blade towards the belt. Adjustment of the vertical controller vertically displaces the entire biasing element. Additionally, the biasing element connected with the vertical controller provides for the angular adjustment of the scraper blade against the belt.

BRIEF DESCRIPTION OF THE DRAWINGS

The foregoing summary, as well as the following detailed description of the preferred embodiments of the present invention, will be better understood when read in conjunction with the appended drawings, in which:

FIG. 3 is an enlarged fragmentary front elevational view of the conveyor belt cleaner of FIG. 1, illustrating a scraper blade in a straight configuration;

FIG. 4 is a front elevational view similar to FIG. 3, illustrating the scraper blade in a curved configuration;

FIG. 5 is a fragmentary side elevational view of the conveyor belt cleaner of FIG. 1, illustrating the cleaner vertically adjusted to an intermediate position;

FIG. 6 is a fragmentary side elevational view of the conveyor belt cleaner of FIG. 1, illustrating the cleaner vertically adjusted to an upper position;

FIG. 7 is a fragmentary side elevational view of the conveyor belt cleaner of FIG. 1, illustrating the cleaner vertically adjusted to a lower position;

FIG. 8 is a side elevational view of the conveyor belt cleaner of FIG. 1, illustrating the cleaner vertically adjusted to an upper position with the scraper blade contacting the conveyor belt;

FIG. 9 is a side elevational view of the conveyor belt cleaner of FIG. 1, illustrating the cleaner vertically adjusted to an intermediate position with the scraper blade contacting the conveyor belt;

FIG. 10A is an enlarged side elevational view of a scraper segment comprising a leading blade and trailing blade;

FIG. 10B is a front elevational view of a leading blade of the scraper segment illustrated in FIG. 10A;

FIG. 10C is a side elevational view of the leading blade illustrated in FIG. 10B.

FIG. 10D is a front elevational view of a mounting plate of the scraper blade segment illustrated in FIG. 10A;

FIG. 10E is a side elevational view of the mounting plate illustrated in FIG. 10D;

FIG. 10F is a front elevational view of a trailing blade of the scraper segment illustrated in FIG. 10A;

FIG. 10G is a side elevational view of the trailing blade illustrated in FIG. 10F.

FIG. 10H is a side elevational view of the scraper illustrated in FIG. 10A, with the tailing blade offset upwardly;

FIG. 13A is an enlarged elevational view of an alternate scraper segment comprising first and second blades;

FIG. 13B is a front elevational view of the first scraper blade of the scraper segment illustrated in FIG. 13A;

FIG. 13C is a side elevational view of the scraper blade illustrated in FIG. 13B;

FIG. 13D is an enlarged front elevational view of the second scraper blade of the scraper segment illustrated in FIG. 13A;

FIG. 13E is a side elevational view of the scraper segment illustrated in FIG. 13D; and FIG. 14 is a fragmentary view of a connecting arm and mounting bracket shown in FIG. 11A with a portion broken away.

DETAILED DESCRIPTION OF THE PREFERRED EMBODIMENTS

Figure 1:
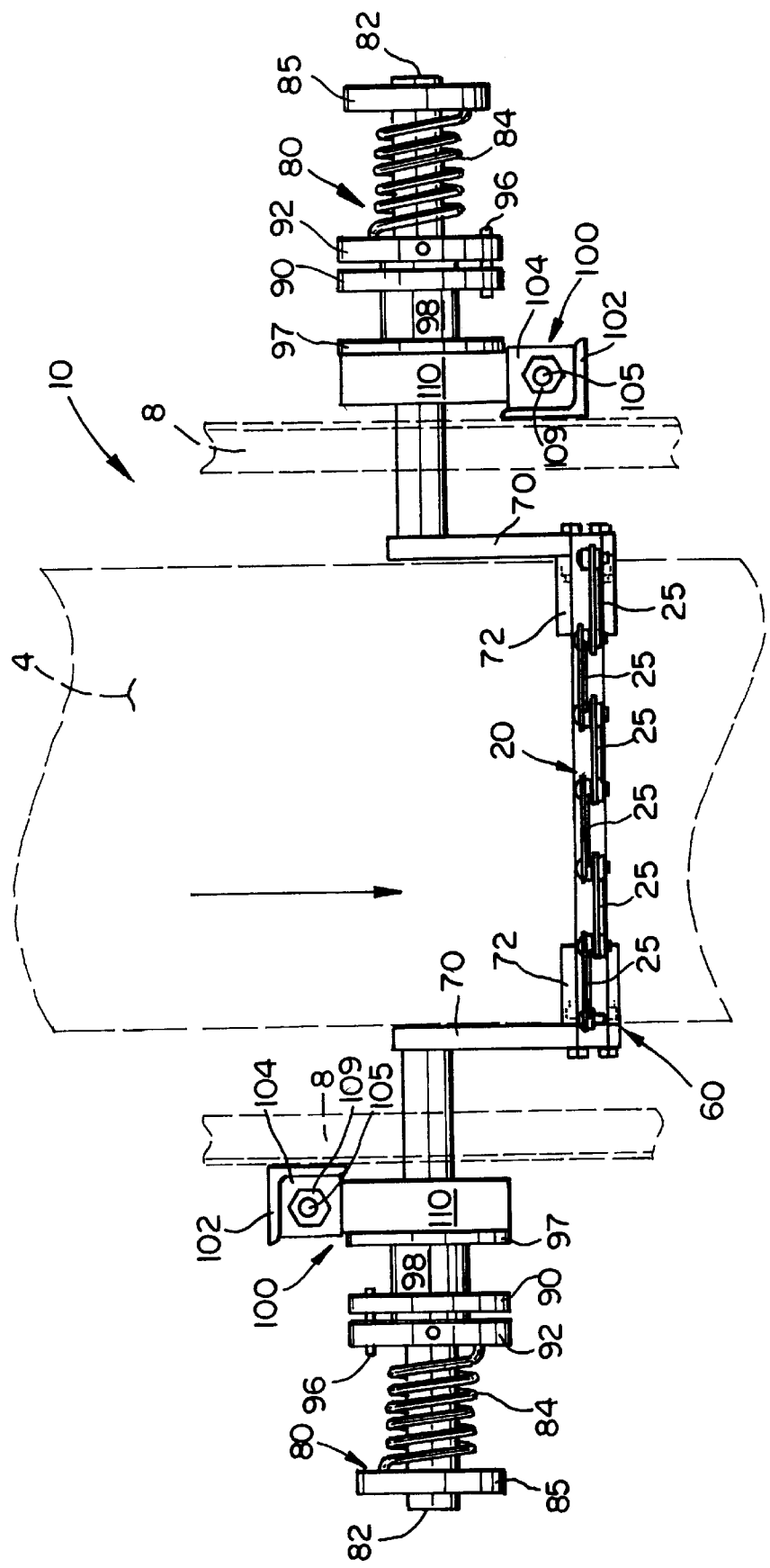
FIG. 1 is a plan view of a conveyor belt cleaner in accordance with the present invention.

Referring now to the drawings in general and to FIG. 1 specifically, a cleaning device 10 for cleaning debris off a conveyor belt 4 is shown. The cleaning device includes a scraper blade assembly 20 that scrapes the surface of the conveyor belt 4 as the conveyor belt is driven past the cleaning device 10. Two tensioners 80 bias the scraper blade assembly 20 toward the conveyor belt 4, to maintain the scraper blade assembly in operative contact with the conveyor belt. The cleaning device also includes two vertical adjustment assemblies 100 for vertically adjusting the height of the tensioners 80. As will be discussed further below, by varying the vertical position of the tensioners 80, the angle that the scraper blade assembly forms with the surface of the conveyor belt 4 can be adjusted.

As can be seen best in FIG. 1, the scraper blade assembly 20 preferably extends across the entire width of the conveyor belt 4. The scraper blade assembly 20 is connected to the two tensioners 80 by a pair of offset arms 70. One of the tensioners is disposed on one side of the conveyor belt, the other tensioner is located on the other side of the belt. Preferably, the tensioners are substantially co-axially aligned forming a pivot axis about which the scraper blade assembly 20 pivots. The scraper blade assembly 20 extends generally parallel to the pivot axis of the tensioners 80 and is laterally spaced from the pivot axis by the offset arms 70. The offset arms 70 extend transverse the tensioners 80 and the scraper blade assembly 20, rigidly connecting the scraper blade assembly to the tensioners.

Figure 2:
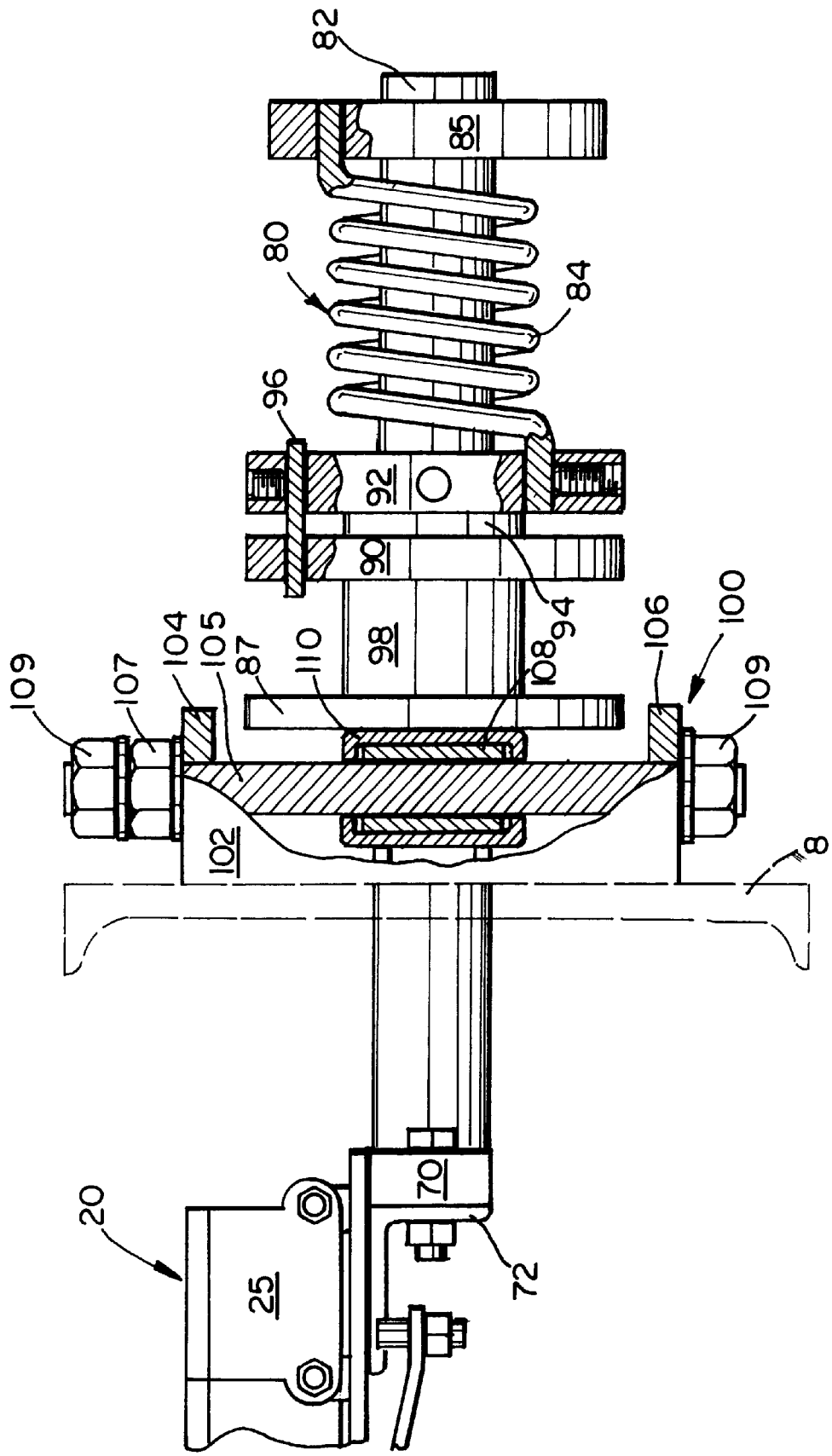
FIG. 2 is a side elevational view partially in section of a vertical adjustment assembly and tensioner operable with the conveyor belt cleaner illustrated in FIG. 1.

The two tensioners 80 are substantially identical, and the details of the tensioners can be most clearly seen in an enlarged view of one of the tensioners, illustrated in FIG. 2. Each tensioner 80 includes an elongated hollow shaft 82. Each tensioner 80 is a rotary tensioner having a torsion spring 84 that circumferentially biases the tensioner 80. The torsion spring 84 is connected to an outside end plate 85 and an adjustment collar 92. As is shown in FIGS. 2 and 5, the outer end plate 85 is a circular plate having a hole through it corresponding to the diameter of the shaft 82. A plurality of set screws 86 fix the outside end plate 85 to the shaft 82 so that the end plate does not move axially or circumferentially relative to the shaft 82. One end of the torsion spring projects into a hole in the outside end plate 85 as is shown in FIG. 2. A set screw locks the one end of the torsion spring 84 in the outside end plate 85 to fix the outside end of the torsion spring. The opposite end of the torsion spring 84 projects into a hole in the end of the adjustment collar 92 and the two are fixed together by a set screw.

The adjustment collar 92 has a plurality of circumferentially spaced holes through its thickness for receiving a locking pin 96. The adjustment collar 92 cooperates with a stationary collar 90, which also has a plurality of circumferentially spaced holes extending its thickness. One of the holes in the adjustment collar 92 is aligned with one of the holes in the stationary collar 90 and the locking pin is inserted into the two collars through the aligned holes. In this way, the adjustment collar 92 is connected to the stationary collar 90 to prevent relative circumferential movement between the two collars.

The bias in the tensioner 80 can be adjusted by rotating the adjustment collar 92 relative to the stationary collar 90. To do so, the locking pin 96 is removed from the two collars to allow the adjustment collar 92 to rotate relative to the stationary collar 90. Rotating the adjustment collar 92 in one direction increases the bias in the tensioner 80; rotating the adjustment collar in the opposite direction decreases the bias in the tensioner. The adjustment collar 92 is rotated until one of the holes in the adjustment collar is aligned with one of the holes in the stationary collar 90. The locking pin 96 is then inserted into the aligned holes in the two collars. In this way, the bias in the tensioner 80 is incrementally adjustable.

As can be seen in FIG. 2, the bias of the torsion spring 84 may include an axial force component that will tend to bias the adjustment collar 92 toward the stationary collar 90. A thrust bearing 94 is disposed on the shaft 82 between the stationary collar 90 and the adjustment collar 92 to facilitate relative circumferential movement of the two collars during adjustment of the adjustment collar.

The stationary collar is connected with an inside plate 87 that is generally fixed circumferentially and axially. If vertical adjustment of the scraper is not necessary or is not desired, the position of the inside end plate 87 can be fixed by connecting the inside end plate to the frame 8 that supports the conveyor belt assembly. However, as is described below, the inside end plate is generally fixed in place by a connecting arm 110 connected to a vertical adjustment assembly 100. A cylindrical spacer 98 is disposed between the inside end plate 87 and the stationary collar 90. The cylindrical spacer 98 is fixed to the inside end plate 87 and the stationary collar 90, preferably by welding. In this way, the axial and circumferential position of the stationary collar 90 is generally fixed.

Referring again to FIG. 1, each tensioner 80 is preferably connected to a vertical adjustment assembly 100 so that the vertical position or height of each tensioner can be varied. Each vertical adjustment assembly 100 controls the vertical position of a connecting arm 110. The connecting arms 110 connect the tensioners 80 to the vertical adjustment assemblies 100. Each connecting arm 110 is transverse the corresponding tensioner 80, and has a hole through its width. The hole is sized to receive the shaft 82 of one of the tensioners. Each tensioner shaft 82 passes through the hole in the corresponding connecting arm 110 to connect the corresponding tensioner 80 and connecting arm. Preferably, each connecting arm is also fixedly connected to the inside end plate 87 of the corresponding tensioner 80 by welding the connecting arm to the inside end plate.

Referring now to FIGS. 1 and 2, the details of the vertical adjustment assembly 100 can best be seen. Each vertical adjustment assembly includes a housing formed of a vertical support 102, a cap 104 and a base 106. The vertical support 102 is a length of L-shaped angle iron. The cap 104 is a generally planar plate fixed along the top of the angle iron 102; the base 106 is a similar plate fixed along the bottom of the angle iron. The vertical adjustment assembly 100 is fixedly connected to the frame 8 that supports the conveyor assembly so that the position of the vertical control assembly is generally fixed.

Referring to FIG. 2, a rotatable threaded rod 105 extends vertically through the housing of the vertical adjustment assembly 100. The cap 104 and base 106 have vertically aligned holes sized to receive the threaded rod 105. The top end of the threaded rod projects upwardly through the hole in the cap 104 and is fixed to a nut 109, preferably by welding. Similarly, the bottom end of the threaded rod projects through the hole in the base 106 and is fixed to a second nut 109, preferably by welding. The welded nuts provide gripping surfaces for a wrench to facilitate turning the threaded rod 105. In addition, a locking nut 107 is provided to lock the vertical position of the vertical adjustment assembly 100. The locking nut threadedly engages the adjustment screw between the cap 104 and the upper nut 109. Once the vertical position of the assembly is adjusted to the desired height, the lock nut is tightened against the cap 104.

As can be seen best in FIG. 2, the connecting arm 110 is a hollow arm having a generally rectangular cross-section. One end of the connecting arm 110 projects into the vertical adjustment assembly 100 and the threaded rod 105 passes vertically through a hole in the connecting arm. A traveler nut 108 is disposed within the hollow interior of the connecting arm and threadedly engages the threaded rod 105. Preferably the traveler nut 108 is fixedly connected to the interior of the connecting arm 110 to prevent the traveler nut from moving relative to the connecting arm.

The operation of the vertical adjustment assembly 100 is as follows. Rotating one of the end nuts 109 rotates the threaded rod 105, which causes the traveler nut 108 to move up or down the threaded rod. Rotating the nut 109 in one direction causes the traveler nut 108 to travel vertically upwardly on the threaded rod 105; turning the nut in the opposite direction causes the traveler nut to travel vertically downwardly along the threaded rod. The connecting arm 110 entrains the traveler nut 108, so that when the traveler nut moves upwardly or downwardly, the connecting arms also moves upwardly or downwardly. In addition, the opposite end of the connecting arm 110 carries the tensioner 80, so that the tensioner 80 moves vertically with the connecting arm.

The tensioner 80 and vertical adjustment assembly 100 are operable with a number of unitary scraper blades that are known in the art. However, in the present instance the cleaning device 10 includes a segmented scraper blade assembly 20. As shown in FIG. 3, the scraper blade assembly 20 is made of a plurality of pivotally connected scraper segments 25. Each scraper segment 25 includes at least one scraping tip. The scraper blade assembly 20 illustrated in FIG. 1, 3–9 is shown incorporating the scraper segments 25 illustrated in FIG. 10A. However, alternatively and preferably, the scraper blade assembly 20 is comprised of a plurality of the scraper segments 125 illustrated in FIG. 13A, which are described further below.

As shown in FIG. 10A, the scraper segment 25 includes a leading scraper blade 30 and a laterally spaced trailing scraper blade 50 connected to a mounting plate 40. Referring to FIG. 10B, the leading blade 30 includes a generally flat, rectangular body 32. A scraping tip 34 that is coextensive with the width of the body 32 is connected to the top edge of the body. The scraping tip is preferably made from a hard wear-resistant material such as carbide or ceramic. A pair of semi-circular connecting tabs 36 project from the sides of the body 32 adjacent the lower edge of the body; one of the connecting tabs projecting from the right side of the body, the other connecting tab projecting from the left side of the body. Each of the connecting tabs 36 includes an aperture 38 extending through the thickness of the body 32.

Referring now to FIG. 10F, the trailing blade includes a generally rectangular planar body 52 and a scraping tip 54. The scraping tip is preferably made of the same material as the tip of the leading blade 34. In addition, the trailing scraping tip 54 is co-extensive with the body 52 of the trailing blade 50. The trailing blade 54 also includes two vertically oriented spaced-apart adjustment slots 56.

A mounting plate is disposed between the leading blade 30 and the trailing blade 50. Referring to FIG. 10D, the mounting plate 40 includes a generally rectangular planar body portion 42 and two spaced-apart threaded studs 44 projecting from the surface of the body 42. The mounting plate further includes a pair of semi-circular connecting tabs 46 configured similarly to the connecting tabs 36 of the leading blade 30. The connecting tabs project from the sides of the mounting plate body 42 adjacent the lower edge of the body. One connecting tab 46 projects from the right side of the body 42, the second projects from the left side of the body. Each connecting tab 46 includes an aperture 48 extending through the thickness of the body 42.

Configured in this way, the scraper segment 25 is assembled as follows. The trailing blade 50 is connected to the mounting plate 40 so that the mounting plate studs 44 pass through the slots 56 in the trailing blade 50. A pair of nuts 58 and washers 59 engage the studs to retain the trailing blade on the mounting plate. The connecting tabs 36 of the leading blade 30 are aligned with the connecting tabs 46 of the mounting plate 40 so that a bolt can pass through the aligned apertures 38, 48 to pivotally connect adjacent scraper segments 25 as will be discussed further below.

As shown in FIGS. 10A and 10H, the vertical position of the trailing blade can be adjusted relative to the leading blade 30. By loosening the nuts 58 retaining the trailing blade on the mounting studs 44, the trailing blade can be vertically adjusted. In this way, height of the trailing blade 50 can be adjusted relative to the leading blade 30 to maintain both blades in contact with the conveyor belt when the angle that the scraper blade forms with the conveyor belt changes, as is discussed further below. Alternatively, the blades can be fixed to the mounting plate 40 so that the blades do not move relative to one another. The blades can be fixed so that the blades are the same height, similar to the segment shown in FIG. 10A, or the blades can be fixed so that the blades are offset, similar to the segment shown in FIG 10H.

Referring now to FIGS. 13A–13E, the preferred scraper segment 125 is illustrated. The preferred scraper segment 125 includes a flat blade 130 and an offset blade 150.

Referring to FIGS. 13B and 13C, the flat blade 130 includes a generally flat, rectangular body 132. A scraping tip 134 that is coextensive with the width of the body 132 is connected to the top edge of the body. The scraping tip is preferably made from a hard wear-resistant material such as carbide or ceramic. A pair of semi-circular connecting tabs 136 project from the sides of the body 132 adjacent the lower edge of the body; one of the connecting tabs projecting from the right side of the body, the other connecting tab projecting from the left side of the body. Each of the connecting tabs 136 includes an aperture 138 extending through the thickness of the body 132.

Referring now to FIGS. 13D and 13E, the offset blade includes a generally rectangular body 152 and the scraping tip 154. The scraping tip is preferably made of the same material as the tip of the flat blade 134. In addition, the scraping tip 154 is coextensive with the body 152. The body of the offset blade further includes a pair of semi-circular connecting tabs 156 configured similarly to the connecting tabs 136 of the flat blade 130. The connecting tabs project from the sides of the offset blade body 152 adjacent the lower edge of the body. One connecting tab 156 projects from the right side of the body 152, the second projects from the left side of the body. Each connecting tab 156 includes an aperture 158 extending through the thickness of the body 152.

As seen most clearly in FIG. 13E, the upper portion of the body 152 is laterally offset from the lower portion of the body by a distance designated a. Preferably the offset is equal to the thickness of the body 132 of the flat blade 130. In this way, as shown in FIG. 13A, the scraping tips of the flat blade 130 and the offset blade 150 are laterally aligned when the blades are connected to form a blade segment 125, Accordingly, the scraping tips, 134, 154 are laterally aligned across the width of the belt when the scraper segments 125 are combined to form a blade assembly.

The straight blade 130 and the offset blade 150 are connected to one another so that the two blades are adjacent to one another. Specifically, a fastener such as a bolt connects one of the connecting tabs 136 of the flat blade 130 with one of the connecting tabs 156 of the offset blade 150. For instance, to form a scraper segment 125, either the left connecting tab of the flat blade 130 is connected to the right connecting tab 156 of the offset blade 150, or the right connecting tab of the flat blade is connected to the left connecting tab of the offset blade. In this way, the scraper blade assembly is formed of a plurality of scraper segments 125 so that the scraper blades alternate between a flat blade 130 and an offset blade 150 along the width of the belt.

Referring now to FIGS. 1, 3 and 4, the scraper segments 25 are mounted onto a blade holder 60. The blade holder 60 includes an elongated generally planar base plate 61 having a plurality of mounting tabs 62 projecting upwardly from the base plate 61. In FIG. 4, the left end of scraper blade 20 is shown broken away to show one of the mounting tabs. The mounting tabs 62 are spaced apart from one another a distance equal to the distance between the apertures through the connecting tabs of each blade segment 25. A pair of L-shaped support brackets 72 connect the blade holder 60 to the offset arms 70, which connect the scraper blade assembly to the tensioners. The L-shaped support brackets 72 are fixedly connected to the lower surface of the base plate 61 adjacent the ends of the base plate, and the support brackets are then bolted to the offset arms.

The blade segments are connected to the blade holder 60 by a plurality of bolts 65. The apertures in the connecting tabs 36 (shown in FIG. 10B) of adjacent blade segments 25 are aligned with an aperture in one of the mounting tabs 62. A bolt 65 passes through the aligned holes in the adjacent scraper segments 25 and the mounting tabs 62 so that the adjacent scraper segments 25 are pivotally connected to one another and also to the mounting tab 62. In this way, the blade segments 25 form a row of parallel blade segments that are pivotally connected to each other.

As shown in FIG. 3, the scraper segments 25 can be vertically aligned so that the segments form a generally horizontal linear scraping profile. In addition, preferably the segments 25 can be adjusted to compensate for wear in the conveyor belt 4, as shown in FIG. 4. In the present instance, a blade profile adjustment assembly 75 is provided for adjusting the profile of the blade assembly 20. The profile adjustment assembly 75 includes an adjustment bar 77 that confronts the base plate 61 of the blade holder 60. A pair of threaded studs 78 connect each end of the adjustment bar 77 to one of the L-shaped support brackets 72 below the base plate 61 of the blade holder. A nut 79 on each of the threaded posts 78 retains the adjustment bar 77 on the threaded posts.

By tightening the nuts 79, the adjustment bar 77 is displaced upwardly into the base plate 61 of the blade holder. The adjustment bar 77 is more rigid than the base plate 61 of the blade holder, so that displacing the adjustment bar against the base plate of the blade holder, deforms the base plate upwardly as illustrated in FIG. 4. Deforming the base plate 61 displaces one or more of the segments 25 relative to the other segments so that the profile of the blade assembly corresponds to the profile of the adjustment bars 77 as shown in FIG. 4.

The base plate 61 may be made of a material that readily deforms when the adjustment bar 77 is forced against the base plate. However, in the present instance, the base plate 61 is made of steel so that the baseplate is semi-rigid. In this way, when the adjustment bar 77 is forced against base plate 61, the adjustment bar will tend to deform the base plate upwardly, and at the same time the base plate will tend to flatten the profile of the adjustment bar.

The profile of the adjustment bar 77 can vary to compensate for different wear-related problems in different conveyor belt applications. In the present instance, the adjustment bar 77 is curved having a generally semi-circular configuration with an apex or node near the mid-point of the adjustment bar. In addition, preferably the profile of the adjustment bar is generally symmetric about the mid-point of the adjustment bar. Configured in this way, the adjustment bar 77 is operable to adjust the profile of the scraper blade assembly 20 to compensate for the increased wear in the center of the conveyor belt that generally occurs forming a belly across the width of the conveyor belt.

With the foregoing description in mind, the cleaning device 10 operates as follows. As shown in FIG. 8, the tensioner 80 biases the scraper blade assembly 20 into operative contact with the conveyor belt 4. If desired, the bias and the tensioner can be adjusted by rotating the adjustment collar 92, as discussed above. During use, the tensioner biases the scraper blade assembly 20 into operative contact with the conveyor belt 4 so that the scraper blade assembly forms an angle with the conveyor belt 4.

The angle that the scraper blade assembly 20 forms with the conveyor belt can be varied if desired by adjusting the vertical adjustment assembly 100. The vertical position of the conveyor belt 4 is generally independent of the adjustment of the vertical adjustment assembly 100. As long as the scraper blade 20 is biased into contact with the conveyor belt 4, the vertical position of the tip of the scraper blade assembly is similarly independent of the adjustment of the vertical adjustment assembly. Instead, adjusting the vertical adjustment assembly 100 operates to alter the angle that the scraper blade assembly 20 forms with the conveyor belt.

For example, in FIG. 8, the vertical adjustment assembly 100 is adjusted to the upper-most position. When the vertical adjustment assembly 100 is adjusted downwardly, the tensioner 82 is also adjusted downwardly as shown in FIG. 9. However, the tensioner maintains the scraper blade 20 in contact with the conveyor assembly 4. Therefore, the vertical position of the top of the scraper blade is the same in FIGS. 8 and 9. To compensate for the change in the position of the tensioner, the tensioner pivots the offset arm 70, which in turn changes the angle that the scraper blade forms with the conveyor belt.

If the angle formed between the scraper blade 20 and the conveyor belt 4 varies substantially from perpendicular, either the leading blade 30 or the trailing blade 50 of each blade segment 25 may not contact the conveyor belt (See FIGS. 9 & 10A). However, the scraper segments shown in FIG. 10A allow the height of the trailing blades 50 in the blade segments 25 to be adjusted relative to the leading blades 30 so that the leading and trailing blades contact the conveyor belt.

Referring now to FIGS. 11A–11D, an alternate embodiment 200 of the cleaning device is illustrated. The alternate embodiment 200 includes a single tensioner shaft 210. The tensioner shaft 210 is circumferentially biased by a biasing element such as the torsional spring 84 described above in connection with the first embodiment. The cleaning device 200 includes a segmented scraper blade assembly 220 that is substantially similar to the scraper blade assembly 20 described above in connection with the first embodiment. The scraper blade assembly 220 includes a plurality of segments substantially similar to the scraper segments 25 illustrated in FIG. 10A. Alternatively, the scraper blade assembly can include a plurality of the scraper segments 125 illustrated in FIG. 13A.

Figure 11A:
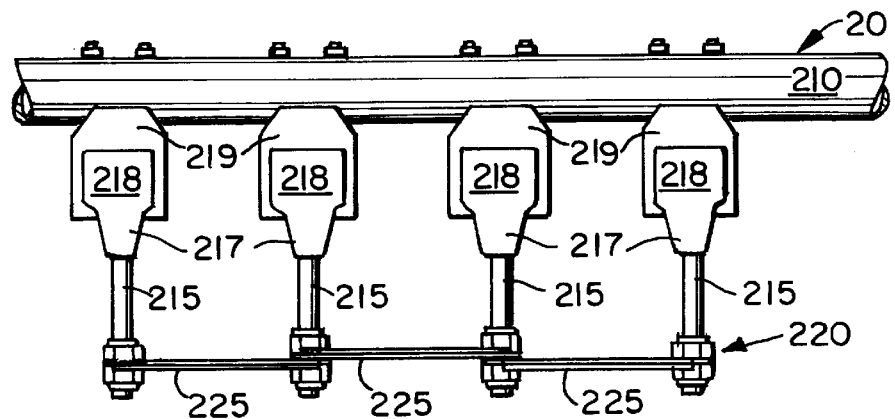
FIG. 11A is an elevational plan view of an alternative embodiment of a conveyor belt cleaner in accordance with the present inventions.
Figure 11B:
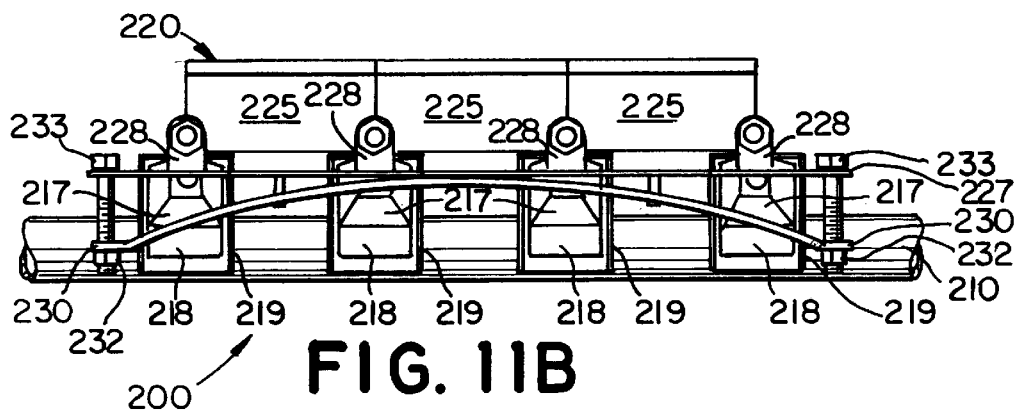
FIG. 11B is a front elevational view of the cleaning device illustrated in FIG. 11A, having a scraper blade in a straight configuration.
Figure 11C:
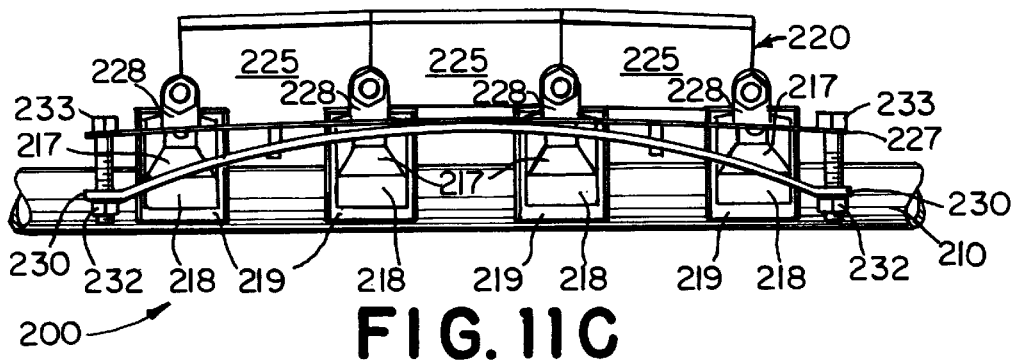
FIG. 11C is a front elevational view of the scraper blade illustrated in FIG. 11B, illustrating the scraper blade in a curved configuration.
Figure 11D:
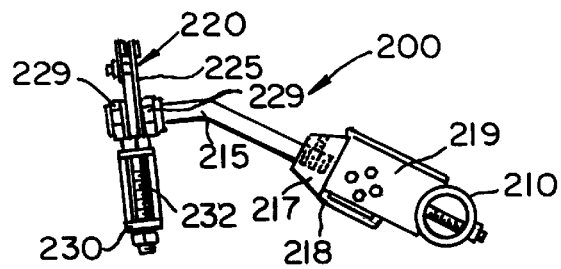
FIG. 11D is a side elevational view of the cleaning device illustrated in FIG. 11A.

The scraper blade assembly 220 is connected to the tensioner shaft 210 by a plurality of connecting arms 215. As shown in FIG. 11D, each connecting arm 215 is bent or angled. The first end of the connecting arm projects through one of the connecting tabs in the scraper blades segments 225 and through a mounting tab 228 projecting from a base plate 227. A pair of nuts 229 threadedly engage the end of the connecting arm 215 to connect adjacent scraper segments 225 to one of the mounting tabs 228.

The opposite end of the connecting arm 215 threadedly engages a base or housing 218. As shown in FIG. 14, the housing 218 encloses a pivot block 245 disposed between a plurality of resilient stop blocks 247. The pivot block 245 is smaller in cross section than the interior of the housing 218 forming a plurality of spaces. The resilient stop blocks 247 are interposed in these spaces between the housing 218 and the pivot block 245. The pivot block 245 is bolted to a mounting bracket 219, which in turn is bolted to the tensioner shaft 210. In this way, the pivot block 245 is rotatably fixed relative to the tensioner shaft 210. However, the housing 218 is pivotable relative to the pivot block 245. As the housing 218 pivots relative to the pivot block 245, the stop blocks 247 are compressed. The compressibility of the stop blocks 247 limits the amount that the housing 218 pivots relative to the pivot block 245 thereby controlling the range that the connecting arm 215 pivots relative to the tensioner shaft 210. In the present, the housing 218 is limited to a pivoting range of approximately 30°.

The flexible stop blocks 247 allow each connecting arm 215 to deflect relative to the other connecting arms in response to changes in the surface of the conveyor belt. In addition, the profile of the scraper blade assembly 220 can be adjusted by a blade profile adjustment assembly 230, which is similar in operation to the blade profile adjustment assembly 75 described above in connection with the first embodiment. In addition, if desired, the alternate cleaning device 200 can be used in connection with one or more vertical adjustment assemblies similar to those described above in connection with the first embodiment.

Figure 12A:
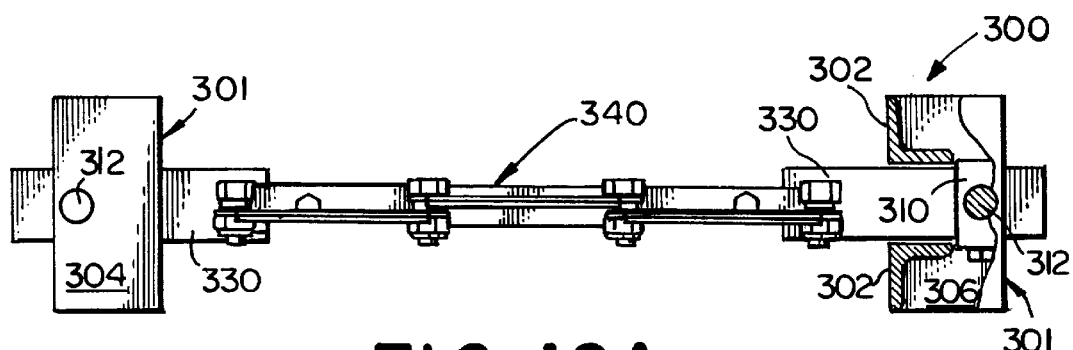
FIG. 12A is a plan view partially in section of a second alternative conveyor belt cleaner in accordance with the present invention.
Figure 12B:
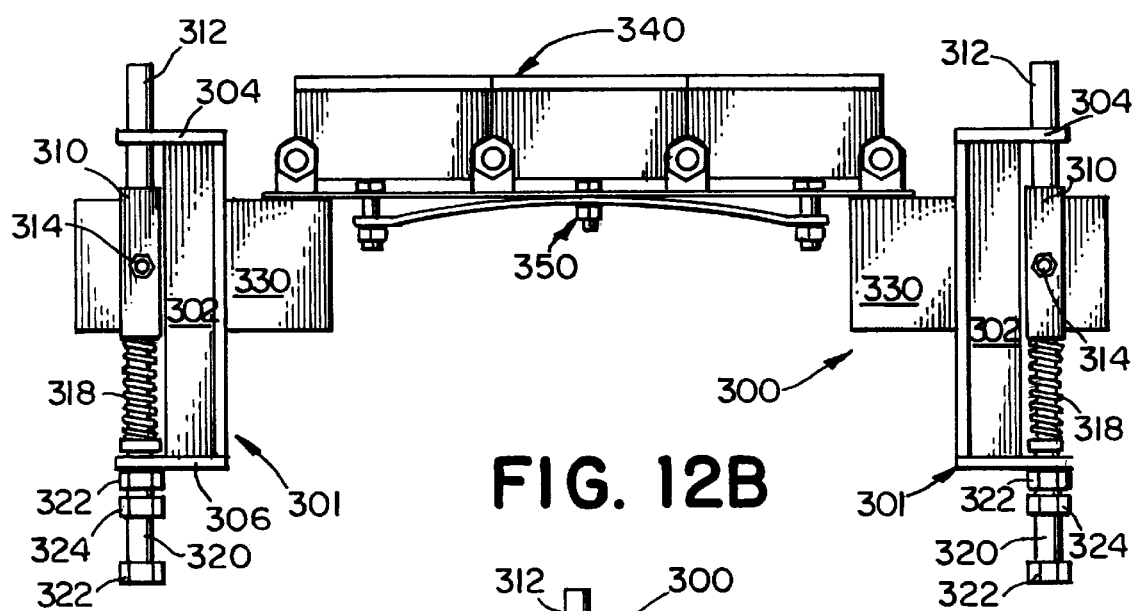
FIG. 12B is a front elevational view of the cleaning device illustrated in FIG. 12A.
Figure 12C:
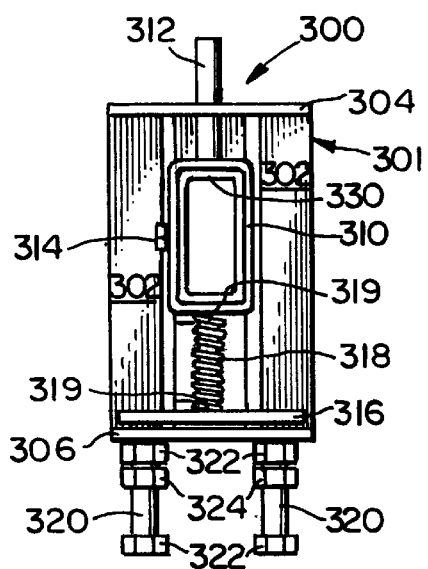
FIG. 12C is a side elevational view of the cleaning device illustrated in FIG. 12A.

Referring now to FIGS. 12A–12C, a second alternate cleaning device 300 is illustrated. The cleaning device illustrated in FIGS. 12A–12C incorporates a vertical tensioner 301 rather than a rotary tensioner 80 as described above in connection with the first and second embodiments. The cleaning device 300 includes a segmented scraper blade assembly 340 and a blade profile adjustment assembly 350 both of which are substantially similar to the scraper blade assembly 20 and blade profile adjustment assembly 75 described above in connection with the first embodiment. Alternately, a blade assembly comprised of the segments 125 illustrated in FIGS. 13A–13E can be utilized.

As shown in FIG. 12B, the scraper blade assembly 340 is mounted on a pair of horizontal scraper support arms 330 that are in turn connected to two vertical tensioners 301. The vertical tensioners 301 include a pair of vertical supports 302 formed of angle irons that straddle each scraper support arm 330. The vertical supports 302 extend between a cap 304 and a base 306, each of which is a generally rectangular plate.

As shown most clearly in FIG. 12C, each vertical tensioner 301 includes a rectangular collar 310 that circumscribes one of the scraper support arms 330. A set screw 314 fixes each collar 310 to the corresponding arm 330. An alignment post 312 projects through a hole in the cap 304 and is connected to the top of the rectangular collar 310. The alignment post 312 vertically aligns the collar 310 as the collar is adjusted upwardly and downwardly as described further below.

A compression spring 318 is disposed between the bottom of the collar 310 and an adjustment plate 316. The spring 318 is retained in place by a pair of spring retention pins 319. One of the pins 319 projects from the adjustment plate 316 into one end of the spring; the other pin projects from the lower end of the collar 310 into the spring.

The adjustment plate 316 is adjusted by a pair of threaded height adjustment rods 320. The adjustment rods project through two holes in the base 306 and are fixed to the bottom of the adjustment plate 316. The adjustment rods 320 threadedly engage a pair of nuts 322 that are fixedly connected to the base of the tensioner 301. In addition, another nut 322 is fixedly attached to the distal end of each height adjustment rod to facilitate turning the adjustment rods.

Rotating the adjustment rods 320 in one direction advances the rods upwardly which in turn moves the adjustment plate 316 upwardly. As the adjustment plate 316 moves upwardly the compression spring 318 compresses, increasing the vertical bias urging the collar 310 and the connected scraper support arm 330 upwardly. Turning the adjustment rods 320 in the opposite direction lowers the adjustment plate 316, which in turn reduces the compression in the spring 318. A pair of lock nuts 324 lock the adjustment rods 320 in place after the rods are adjusted.

It will be recognized by those skilled in the art that changes or modifications may be made to the above-described embodiments without departing from the broad inventive concept of the invention. It should therefore be understood that this invention is not limited to the particular embodiments described herein but is intended to include all changes and modifications that are within the scope and spirit of the invention as set forth in the following claims.

That which is claimed:

1. An apparatus for cleaning a conveyer belt, comprising:
   a scraper blade comprising a plurality of blade segments each having a blade body and forming a parallel row of aligned segments, each blade segment being pivotally connected to an adjoining blade segment to pivot in the plane of the blade body; and
   a blade support holding the scraper blade in operative contact with the belt to remove debris from the belt.

2. An apparatus for cleaning a conveyer belt, comprising:
   a scraper blade for scraping debris from the conveyor belt;
   a blade support holding the scraper blade in operative contact with the belt;
   a shaping element having a non-linear configuration wherein the shaping element is operable to deform the scraper blade so that the scraper blade has a configuration corresponding to the shaping element configuration;
   and an adjustment element for adjusting the configuration of the shaping element.

3. The apparatus of claim 2, wherein the shaping element has first and second ends and the shaping element configuration is curved having an apex intermediate the first and second ends.

4. The apparatus of claim 2, comprising an adjustable vertical controller operable to adjust the position of the scraper blade.

5. The apparatus of claim 2, comprising a biasing element biasing the scraper blade towards the belt.

6. The apparatus claim 4, comprising a biasing element biasing the scraper blade toward the belt, wherein the bias in the biasing element is independent of the adjustment of the vertical controller.

7. The apparatus of claim 4, comprising a biasing element biasing the scraper blade toward the belt, wherein the biasing element has first and second ends and adjustment of the vertical controller adjusts the position of the first and second ends of the biasing element.

8. An apparatus for cleaning a conveyer belt, comprising:
a scraper blade for scraping debris from the conveyor belt;
a blade support holding the scraper blade in operative contact with the conveyor belt;
an adjustable vertical controller operable to adjust the position of the scraper blade; and
a biasing element connected with the vertical controller, wherein the biasing element biases the scraper blade towards the belt and the bias in the biasing element is independent of the adjustment of the vertical controller.

9. An apparatus for cleaning a conveyer belt, comprising:
a scraper blade for removing debris from the conveyor belt;
a blade support holding the scraper blade in operative contact with the conveyor belt to remove debris from the belt;
an adjustable vertical controller operable to adjust the position of the scraper blade; and
a biasing element connected with the vertical controller, wherein the biasing element has first and second ends and adjustment of the vertical controller adjusts the position of the first and second ends of the biasing element.

10. The apparatus of claim 1 wherein each of the aligned segments has a scraping tip and the scraping tips of the aligned segments lie in the parallel row.

11. The apparatus of claim 1 wherein each of the aligned segments has a scraping tip and adjacent ones of the plurality of blade segments have a flat body and an offset body, respectively, to align the scraping tips thereof.

12. The apparatus of claim 8 wherein the biasing element includes a torsional biasing element coupled to the blade support and to the vertical controller.

13. The apparatus of claim 8 wherein the scraper blade includes a plurality of blade segments pivotally mounted to the blade support.

14. The apparatus of claim 9 wherein the biasing element includes a torsional biasing element having its first end coupled to the blade support and its second end coupled to the vertical controller.

15. The apparatus of claim 9 wherein the scraper blade includes a plurality of blade segments pivotally mounted to the blade support.

* * * * *